United States Patent
Okuda et al.

(10) Patent No.: US 7,947,754 B2
(45) Date of Patent: May 24, 2011

(54) FOAM

(75) Inventors: Tohru Okuda, Tokyo (JP); Shoichiro Harada, Tokyo (JP); Yoshihito Fukasawa, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 349 days.

(21) Appl. No.: 12/087,984

(22) PCT Filed: Jan. 18, 2007

(86) PCT No.: PCT/JP2007/050703
§ 371 (c)(1),
(2), (4) Date: Jul. 18, 2008

(87) PCT Pub. No.: WO2007/083705
PCT Pub. Date: Jul. 26, 2007

(65) Prior Publication Data
US 2009/0012194 A1    Jan. 8, 2009

(30) Foreign Application Priority Data
Jan. 19, 2006 (JP) ................................ 2006-011437

(51) Int. Cl.
*C08J 9/12* (2006.01)
*C08J 9/04* (2006.01)
*C08L 25/04* (2006.01)

(52) U.S. Cl. ........ 521/134; 521/139; 521/140; 521/144; 521/145; 521/146; 521/149; 525/190; 525/411; 525/419

(58) Field of Classification Search .................. 521/134, 521/139, 140, 144, 145, 146, 149; 525/190, 525/411, 419
See application file for complete search history.

(56) References Cited

U.S. PATENT DOCUMENTS

| | | | |
|---|---|---|---|
| 2008/0146686 A1 * | 6/2008 | Handa | 521/58 |
| 2009/0123728 A1 * | 5/2009 | Cheung et al. | 428/304.4 |
| 2009/0270524 A1 * | 10/2009 | Oka et al. | 521/138 |

FOREIGN PATENT DOCUMENTS

| | | |
|---|---|---|
| JP | 4-304244 | 10/1992 |
| JP | 2000-136256 | 5/2000 |
| JP | 2001-131308 | 5/2001 |
| JP | 2002-167456 | 6/2002 |
| JP | 2002-317066 | 10/2002 |
| JP | 2003238789 A * | 8/2003 |
| JP | 2005-272695 | 10/2005 |
| JP | 2006-77063 | 3/2006 |
| JP | 2006-183007 | 7/2006 |
| JP | 2006-321988 | 11/2006 |
| JP | 2006-328314 | 12/2006 |
| JP | 2006-328318 | 12/2006 |
| JP | 2006-348060 | 12/2006 |
| JP | 2006328318 A * | 12/2006 |
| JP | 2006348060 A * | 12/2006 |
| WO | 2006/103969 A1 | 10/2006 |

OTHER PUBLICATIONS

International Search Report (PCT/ISA/210) of International Application PCT/JP2007/050703 (mailed on Mar. 27, 2007).
Database WPI Week 200581, Thomson Scientific, London, GB, AN 2005-789350, XP002510269 & JP 2005 298797 A (Asahi Kasei KK) Oct. 27, 2005 *abstract*.
European Search Report issued Mar. 6, 2009 in corresponding European Patent Application 07707007.6.

* cited by examiner

*Primary Examiner* — Irina S Zemel
(74) *Attorney, Agent, or Firm* — Staas & Halsey LLP

(57) ABSTRACT

The present invention provides a foam comprising (a) a polylactic acid resin, (b) at least one thermoplastic resin selected from a polyolefin resin and a polystyrene resin, and (c) a block copolymer of a vinyl aromatic compound and a conjugated diene, wherein a ratio of (a) to (b) by weight (a/b) is 80/20 to 20/80, and the foam comprises 0.5 to 20 parts by weight of (c) with respect to 100 parts by weight of (a) and (b) in total.

20 Claims, No Drawings

FOAM

CROSS REFERENCE TO RELATED PATENT APPLICATIONS

This application claims the benefit under 35 U.S.C. §371, of PCT International Application No. PCT/JP2007/050703, filed Jan. 18, 2007, which claimed priority to Japanese Application No. 2006-011437, filed Jan. 19, 2006, in the Japanese Patent Office, the disclosures of which are hereby incorporated by reference.

TECHNICAL FIELD

The present invention relates to a foam and a production method thereof. The foam of the present invention is employed in cushioning packaging materials for industrial products and the like, heat insulating materials for houses and the like, core materials for sporting equipment such as kickboards and bodyboards, and floating materials for floats and the like.

BACKGROUND ART

In recent years, aliphatic polyester has received attention as a resin that produces a small environmental load. Originally, the aliphatic polyester has been employed mainly for the purpose of exploiting its characteristic, biodegradability. However, in fact, the characteristic of biodegradability has effectively been utilized solely in applications such as agriculture and fishery where the aliphatic polyester is used outdoors and is difficult to recover. On the other hand, applications such as cushioning packaging materials or heat insulating materials, which are likely to be used in environments of high temperature and high humidity or require long-term resistance, had the problem of being unavailable if they were highly degradable.

Recently, a characteristic valued highly instead of biodegradability for environmentally friendly resins is that biomass materials derived from plants are used as the raw materials thereof. In such situations, polylactic acid that has been produced in large amounts at low cost by the polymerization of lactic acid derived from plants started to rank as the dominant aliphatic polyester.

As described above, polylactic acid has an excellent characteristic of producing a small environmental load and being relatively inexpensive. However, the polylactic acid presents the following problems when used as a raw material for a foam:

The first problem is that polylactic acid has a small melt tension and results in a closed cell content decreased due to the burst of air bubbles generated in a foaming process. When air bubbles burst, foaming agents within the air bubbles dissipate outside the air bubbles. As a result, the air bubbles stop growing, and therefore, an expansion ratio is decreased. A foam having a low expansion ratio, that is, a high density, does not sufficiently acquire characteristics such as light weights, cushioning properties, and heat insulating properties. For example, only a thin foam sheet having a density on the order of 0.3 g/cm$^3$ is obtained in Patent Document 1.

The second problem is that polylactic acid softens over a glass transition temperature of usually 50 to 60° C. due to its low allowable temperature limit and becomes deformed by a load applied thereto. Polylactic acid composed of highly pure L-lactic acid or D-lactic acid as a raw material is crystalline. Its heat resistance is enhanced with increases in the degree of crystallinity. However, the crystallization speed of polylactic acid is generally exceedingly slow. High-temperature curing for a long time is required for increasing the degree of crystallinity. Furthermore, polylactic acid loses crystallinity and becomes amorphous when the purity of L-lactic acid or D-lactic acid is lowered and the content of the lactic acid unit contained in a lower amount exceeds approximately 10%. Patent Document 2 has disclosed that the use of an amorphous polylactic acid having a particular melt viscosity can enhance foamability. However, this polylactic acid is amorphous and therefore has a low heat resistance.

Third, polylactic acid lacks flexibility when used in applications such as cushioning materials where a foam is compressed. Therefore, there arises a problem that the extent to which the foam that has been compressed and crushed recovers a thickness is small.

To solve these problems, a method is used wherein a polyolefin resin or polystyrene resin having high foamability and high heat resistance is blended with polylactic acid. However, the problem in this case is that highly polar polylactic acid is incompatible with the nonpolar polyolefin resin or polystyrene resin and therefore results in a nonuniform mixture that does not foam, or if the mixture foams, a closed cell content is decreased due to exfoliation occurring in the interface between them. In Patent Document 3, highly polar organic acid ester having an epoxy group capable of reacting with the terminal group of polylactic acid is used as a compatibilizer component for blending polylactic acid and a polyolefin resin. However, only a foam in a thin sheet form having a low expansion ratio and a small section is obtained.

[Patent Document 1] JP-A-04-304244
[Patent Document 2] JP-A-2002-317066
[Patent Document 3] WO 2006/103969

DISCLOSURE OF THE INVENTION

An object of the present invention is to provide a foam having a high closed cell content and expansion ratio and having an increased heat resistance, which is obtained using a material that produces a small environmental load.

The present inventors have conducted diligent studies for attaining the object and have consequently completed the present invention.

Specifically, the present invention is as follows:

1. A foam comprising (a) a polylactic acid resin, (b) at least one thermoplastic resin selected from a polyolefin resin and a polystyrene resin, and (c) a block copolymer of a vinyl aromatic compound and a conjugated diene, wherein a ratio of (a) to (b) by weight (a/b) is 80/20 to 20/80, and the foam comprises 0.5 to 20 parts by weight of (c) with respect to 100 parts by weight of (a) and (b) in total.

2. The foam according to the above item 1, wherein the block copolymer (c) of the vinyl aromatic compound and the conjugated diene is a styrene-butadiene block copolymer resin.

3. The foam according to the above item 1 or 2, wherein the thermoplastic resin (b) has a melt tension of 2 to 200 gf at 190° C.

4. The foam according to any one of the above items 1 to 3, wherein the thermoplastic resin (b) has a Vicat softening point of 80° C. or higher.

5. The foam according to any one of the above items 1 to 4, wherein a ratio of a melt mass-flow rate of the thermoplastic resin (b) (MFR-b) at 190° C. to a melt mass-flow rate of the polylactic acid resin (a) (MFR-a) at 190° C. (MFR-b/MFR-a) is 0.01 to 10.

6. The foam according to any one of the above items 1 to 5, wherein the polylactic acid resin (a) is a copolymer of 10 to 90% by mole of L-lactic acid and 90 to 10% by mole of D-lactic acid.
7. The foam according to any one of the above items 1 to 6, wherein the polylactic acid resin (a) is modified with at least one modifier selected from a carbodiimide compound, an epoxy compound, an isocyanate compound, and an organic peroxide, and an amount of the modifier added is 0.05 to 10 parts by weight with respect to 100 parts by weight of the polylactic acid resin.
8. The foam according to any one of the above items 1 to 7, wherein the thermoplastic resin (b) comprises (b-1) a low-density polyethylene resin and (b-2) at least one member selected from high-density polyethylene, a polypropylene resin, and a polystyrene resin, and a ratio of (b-1) to (b-2) by weight is 90/10 to 10/90.
9. The foam according to any one of the above items 1 to 8, wherein the foam has a density of 0.005 to 0.5 g/cm$^3$.
10. A cushioning material using the foam according to any one of the above items 1 to 9.
11. A heat insulating material using the foam according to any one of the above items 1 to 9.

The foam of the present invention has a high closed cell content, expansion ratio, and heat resistance. Furthermore, the foam also having excellent property of recovery in compression can be obtained by using a particular resin composition as a raw material.

BEST MODE FOR CARRYING OUT THE INVENTION

Hereinafter, the present invention will be described in detail with emphasis on the preferred embodiments thereof.

A polylactic acid resin used as component (a) in the present invention includes poly-L-lactic acid comprising L-lactic acid as a constituent, poly-D-lactic acid comprising D-lactic acid as a constituent, and poly-DL-lactic acid comprising L-lactic acid and D-lactic acid as constituents. These resins can be used alone or mixed appropriately for use.

Preferably, poly-DL-lactic acid is used as the polylactic acid resin of the present invention. A constituent ratio between L-lactic acid and D-lactic acid is arbitrarily selected. Preferably, the polylactic acid resin is a copolymer of 10 to 90% by mole of L-lactic acid and 90 to 10% by mole of D-lactic acid, more preferably 10 to 30% or 70 to 90% by mole of L-lactic acid and 90 to 70% or 30 to 10% by mole of D-lactic acid. The constituent ratio between L-lactic acid and D-lactic acid of the polylactic acid resin that falls within the range described above is preferable because the polylactic acid resin is amorphous and gives a foam having a higher closed cell content and expansion ratio.

The polylactic acid resin (a) of the present invention may contain a copolymerization component other than lactic acid. A monomer unit other than lactic acid can include: diols such as ethylene glycol, propylene glycol, butanediol, heptanediol, hexanediol, octanediol, nonanediol, decanediol, 1,4-cyclohexanedimethanol, neopentyl glycol, bisphenol A, polyethylene glycol, polypropylene glycol, and polytetramethylene glycol; polyols such as glycerin and pentaerythritol; dicarboxylic acid such as oxalic acid, adipic acid, sebacic acid, azelaic acid, dodecanedionic acid, malonic acid, glutaric acid, cyclohexanedicarboxylic acid, terephthalic acid, isophthalic acid, phthalic acid, naphthalenedicarboxylic acid, bis (p-carboxyphenyl)methane, anthracenedicarboxylic acid, 4,4'-diphenyl ether dicarboxylic acid, 5-sodium sulfoisophthalic acid, and 5-tetrabutylphosphonium isophthalic acid; hydroxycarboxylic acid such as glycolic acid, hydroxypropionic acid, hydroxybutyric acid, hydroxyvaleric acid, hydroxycaproic acid, and hydroxybenzoic acid; and lactones such as caprolactone, valerolactone, propiolactone, undecalactone, and 1,5-oxepan-2-one. The proportion of these copolymerization components to all the monomers is preferably 50% by mole or less, more preferably 30% by mole or less.

The polylactic acid resin (a) of the present invention may contain an aliphatic polyester resin other than polylactic acid. The aliphatic polyester resin can include a polycondensate of polyhydric carboxylic acid and polyhydric alcohol, a ring-opening polymerization product of lactone, polyhydroxyalkanoic acid, polyglycolic acid, and polyvinyl alcohol.

Preferably, the polylactic acid resin (a) of the present invention has a weight-average molecular weight of 50,000 to 500,000, more preferably 100,000 to 300,000.

The polylactic acid resin (a) of the present invention may be modified with a modifier for use. The modifier includes a carbodiimide compound, an epoxy compound, an isocyanate compound, and an organic peroxide. These modifiers can be used alone or in combination. The degradability of the polylactic acid resin can be suppressed moderately by modifying the polylactic acid resin with these modifiers. Alternatively, modification with a modifier having two or more corresponding functional groups is preferable because the polylactic acid resin modified therewith has an increased melt tension and higher foamability.

The polylactic acid resin (a) may be modified with 0.05 to 10 parts by weight of the modifier with respect to 100 parts by weight of the polylactic acid resin. A preferable amount of the modifier is 0.1 to 5 parts by weight.

The carbodiimide compound that can be used as a modifier in the present invention may be either monocarbodiimide or polycarbodiimide. Examples of the monocarbodiimide include N,N'-diphenylcarbodiimide and N,N'-di-2,6-diisopropylphenylcarbodiimide. The polycarbodiimide that can be used is obtained through the polymerization reaction of any diisocyanate. Any of aliphatic, alicyclic, and aromatic diisocyanates may be used.

The epoxy compound that can be used as a modifier in the present invention may be any of aliphatic, alicyclic, and aromatic epoxy compounds. Examples thereof include propylene oxide and phenylglycidyl ether. A compound having several epoxy groups may be used as the epoxy compound.

The isocyanate compound that can be used as a modifier in the present invention may be any of aliphatic, alicyclic, and aromatic isocyanate compounds. Examples thereof include hexamethylene isocyanate and xylylene isocyanate. A compound having several isocyanate groups may be used as the isocyanate compound.

The organic peroxide that can be used as a modifier in the present invention may be any of aliphatic, alicyclic, and aromatic organic peroxides. Examples thereof include dibutyl peroxide and benzoyl peroxide. A compound having several peroxide moieties, such as bis(butylperoxy)trimethylcyclohexane, may be used as the organic peroxide.

Preferably, a thermoplastic resin used as a component (b) in the present invention has a melt tension (MT) of 2 to 200 gf, more preferably 3 to 150 gf, even more preferably 4 to 100 gf, at 190° C. When two or more thermoplastic resins (b) are mixed for use, they are melt-mixed in advance and a value of the molten mixture is measured and used as a melt tension.

The melt tension value of the present invention is obtained by measurement by a method described below. An apparatus used is Capillograph 1C manufactured by Toyo Seiki Sei-saku-sho, Ltd. A molten resin composition heated to 190° C. is first extruded in a corded form at a piston speed of 10 mm/min. from a nozzle of 1 mm in caliber and 10 mm in length. The corded extrusion is then allowed to pass through a tension detection pulley and then reeled at a predetermined speed to thereby measure its tension. According to this method, a draw speed is gradually increased starting in 1 m/min., and the greatest value of a tension until the corded extrusion is cut off or at a draw speed changed to 60 m/min. at the maximum (if the corded extrusion is not cut off) is used as a melt tension.

When the melt tension of the thermoplastic resin (b) is 2 gf or more, a bubble membrane is prevented from bursting in a foaming process during which air bubbles grow, and a closed cell content tends to be increased. Moreover, foaming agents within the air bubbles do not dissipate outside the air bubbles. Therefore, the air bubbles sufficiently grow, and an expansion ratio can be increased. When the melt tension is 200 gf or less, air bubbles sufficiently grow. Therefore, the resulting foam tends to have a high expansion ratio and a low density.

In the present invention, a ratio of the polylactic acid resin (a) to the thermoplastic resin (b) by weight (a/b) is 80/20 to 20/80, preferably 70/30 to 30/70.

When the proportion of the polylactic acid resin (a) by weight is 20% by weight or more, the high stiffness and plant-derived environmentally friendly property of the polylactic acid resin can be maintained. When the proportion of the thermoplastic resin (b) by weight is 20% by weight or more, a closed cell content and a heat resistance can be increased further.

Preferably, the thermoplastic resin (b) of the present invention has a Vicat softening point of 80° C. or higher, more preferably 90° C. or higher, even more preferably 100° C. or higher.

When the Vicat softening point of the thermoplastic resin (b) is set to 80° C. or higher, a higher heat resistance is obtained. As a result, the thermoplastic resin (b) can be prevented from being deformed when used at high temperatures. The Vicat softening point is a value measured according to JIS K7206 (A50 method: test load of 10 N, rate of heating of 50° C./h).

The thermoplastic resin (b) of the present invention includes: ethylene homopolymers such as high-density polyethylene, medium-density polyethylene, low-density polyethylene, and linear low-density polyethylene; polyolefin resins and styrene homopolymers such as polypropylene homopolymers, polybutylene homopolymers, ethylene-vinyl acetate copolymers, ethylene-propylene copolymers, ethylene-butene copolymers, ethylene-butene-propylene copolymers, and ethylene-acrylic acid copolymers; copolymers of styrene with monomers such as α-methylstyrene, acrylonitrile, butadiene, and methyl methacrylate, which are capable of copolymerization with styrene; and polystyrene resins such as copolymers with rubber polymers mainly composed of polystyrene generally called high-impact polystyrene. These resins can be used alone or mixed appropriately for use. Among them, resins having a higher Vicat softening point, such as high-density polyethylene, a polypropylene resin, and a polystyrene resin can be used alone or in combination to thereby further increase the heat resistance of a foam.

Furthermore, very flexible low-density polyethylene can be mixed with at least one member selected from high-density polyethylene, a polypropylene resin, and a polystyrene resin having a very high heat resistance and used as the thermoplastic resin (b) to thereby give a foam having both high heat resistance and excellent property of recovery in compression. This foam keeps a high recovery property even when it undergoes compression several times. Therefore, the foam is very preferable as a cushioning material.

In the present invention, the polylactic acid resin (a) and the thermoplastic resin (b) can be mixed more uniformly and compatibly by using a block copolymer (c) of a vinyl aromatic compound and a conjugated diene.

The vinyl aromatic compound used in the component (c) includes styrene, o-methylstyrene, p-methylstyrene, p-tert-butylstyrene, 1,3-dimethylstyrene, α-methylstyrene, vinylnaphthalene, vinylanthracene, 1,1-diphenylethylene, N,N-dimethyl-p-aminoethylstyrene, and N,N-diethyl-p-aminoethylstyrene. Particularly general examples thereof include styrene. They may be used alone or as a mixture of two or more of them.

The conjugated diene used in the component (c) is diolefin having a pair of conjugated double bonds. Examples thereof include 1,3-butadiene, 2-methyl-1,3-butadiene (isoprene), 2,3-dimethyl-1,3-butadiene, 1,3-pentadiene, and 1,3-hexadiene. Particularly general examples thereof include 1,3-butadiene and isoprene. They may be used alone or as a mixture of two or more of them.

The block copolymer (c) of a vinyl aromatic hydrocarbon and a conjugated diene used in the present invention may have double bond moieties fully or partially hydrogenated.

The block copolymer (c) of a vinyl aromatic hydrocarbon and a conjugated diene used in the present invention is particularly preferably a styrene-butadiene block copolymer. Specific examples thereof include SBS (styrene-butadiene-styrene), SEBS (styrene-ethylene-butylene-styrene) where the double bonds in SBS are fully hydrogenated, and SBBS (styrene-butadiene-butylene-styrene) where the double bonds in SBS are partially hydrogenated.

An amount of the component (c) of the present invention is 0.5 to 20 parts by weight, more preferably 1 to 10 parts by weight, with respect to 100 parts by weight of a resin component consisting of the polylactic acid resin (a) and the thermoplastic resin (b).

In the present invention, a ratio of a melt mass-flow rate of a thermoplastic resin (b) at 190° C. to a melt mass-flow rate of a polylactic acid resin (a) at 190° C. (MFR-b/MFR-a) is preferably 0.01 to 10, more preferably 0.05 to 5. When two or more polylactic acid resins (a) or two or more thermoplastic resins (b) are mixed for use, the resins are melt-mixed in advance, and the melt mass-flow rate of the molten mixture is used. When the ratio of the melt mass-flow rates (MFR-b/MFR-a) is set to the range described above, a composition where the polylactic acid resin (a) and the thermoplastic resin (b) are mixed more uniformly and compatibly can be obtained. The melt mass-flow rate is a value measured according to JIS K7210 (Code D: test temperature of 190° C., test load of 2.16 kg).

A foam of the present invention can be produced by an extrusion foaming method as well as any method such as a bead foaming method wherein particles impregnated with a foaming agent are in-mold molded and an injection molding method wherein a foaming agent is melt-kneaded in an extruder and then injected into a mold, followed by foam molding. The extrusion foaming method is preferable. The extrusion foaming method is a method wherein a resin, a foaming agent, a gas permeation regulator, and if necessary, an additive such as a bubble nucleation agent are melt-kneaded under pressure in an extruder and then cooled to an appropriate foaming temperature to obtain a foamable molten mixture, which is in turn extruded and foamed under atmospheric pressure through a die attached to the tip of the extruder.

The foaming agent that can be used for producing the foam of the present invention includes physical foaming agents and chemical foaming agents.

The physical foaming agents include: aliphatic hydrocarbons such as propane, normal butane, isobutane, normal pentane, isopentane, and hexane; cyclic aliphatic hydrocarbons such as cyclobutane and cyclopentane; halogenated hydrocarbons such as chlorodifluoroethane, difluoroethane, methyl chloride, ethyl chloride, trichlorofluoromethane, dichlorodifluoromethane, tetrafluoroethane, dichlorotetrafluoroethane, and methylene chloride; and foaming agents such as air, nitrogen, water, carbon dioxide, and argon.

The chemical foaming agents include azodicarbonamide, dinitrosopentamethylenetetramine, azobisisobutyronitrile, benzenesulfonyl hydrazide, toluenesulfonyl hydrazide, and sodium hydrogencarbonate.

These physical and chemical foaming agents can be mixed appropriately for use.

A gas permeation regulator generally used may be added, if necessary, to a resin composition for a foam containing (a), (b), and (c) in the production of the foam. Examples of the gas permeation regulator include: fatty acid glyceride such as glyceride palmitate and glyceride stearate; fatty acid amide such as oleic acid amide and erucic acid amide; and alkyl fatty acid amide such as stearylstearic acid amide. These gas permeation regulators can be used alone or mixed appropriately for use. The speed of outflow of the foaming agent and the speed of inflow of air in the atmosphere are regulated by using these gas permeation regulators. As a result, changes in the volume of the foam can be reduced to thereby stabilize the foam.

A bubble nucleation agent generally used may be used, if necessary, in the resin composition for a foam. Examples of the bubble nucleation agent include inorganic substances such as talc, metal salts of fatty acid such as zinc stearate, chemical foaming agents that generates cracked gas by decomposition at a temperature of an extruder, and a mixture of an acid and an alkali that generates carbon dioxide by reaction at the temperature. These bubble nucleation agents can be used alone or mixed appropriately for use. The cell size of the obtained foam can be controlled arbitrarily by using these bubble nucleation agents.

Furthermore, additives such as anti-static agents, antioxidants, UV absorbers, and coloring agents can also be added, if necessary, to the mixed resins in the resin composition for a foam.

After the molding of the foam, the foam may be subjected, if necessary, to a piercing treatment wherein the foam is pierced through with a needle-shaped jig. The substitution of the foaming agent present within the foam by air in the atmosphere can be promoted by performing the piercing treatment.

The shape of the foam obtained in the present invention is not limited. Examples thereof include sheet-shaped, plate-shaped, rod-shaped, pipe-shaped, bead-shaped, and a variety of in-mold molded products.

Preferably, the foam of the present invention has a density of 0.005 to 0.5 g/cm$^3$, more preferably 0.01 to 0.2 g/cm$^3$. When the density is 0.005 to 0.5 g/cm$^3$, the foam can be used preferably as applications such as heat insulating materials, floating materials, and cushioning packaging materials. The density is a value measured according to JIS K7222.

The closed cell content of the foam obtained in the present invention is preferably 70 to 100%, more preferably 80 to 100%, even more preferably 90 to 100%, except for pore portions produced by piercing. When the closed cell content is 70% or more, the foam can exhibit sufficient cushioning performance as a cushioning packaging material. Besides, water absorption can be reduced because water hardly enters into the foam.

The cell size of the foam of the present invention is preferably 0.01 mm to 5.0 mm, more preferably 0.1 mm to 3.0 mm. In heat insulating material applications, the smaller the cell size is, the better heat insulating performance becomes. When the cell size is large, a cell aperture plane permits water entrance thereinto on contact with water, leading to increased water absorption.

EXAMPLES

Hereinafter, the present invention will be explained with reference to specific examples.

The values measured in the examples were determined by methods described below. The measurement methods used in the present invention are as follows:

(1) Melt Mass-Flow Rate (MFR) of Resin

The measurement is carried out according to JIS K7210 (Code D: test temperature of 190° C., test load of 2.16 kg).

(2) Melt Tension (MT) of Resin

An apparatus used is Capillograph (trademark) 1C manufactured by Toyo Seiki Seisaku-sho, Ltd. A molten resin composition heated to 190° C. is extruded in a corded form at a piston speed of 10 mm/min. from a nozzle of 1 mm in caliber and 10 mm in length. The corded extrusion is then allowed to pass through a tension detection pulley and then reeled at a predetermined speed to thereby measure its tension. According to this method, a draw speed is gradually increased starting in 1 m/min., and the greatest value of a tension at a draw speed changed to 60 m/min. at the maximum (if the corded extrusion is not cut off) is used as a melt tension.

(3) Vicat Softening Point of Resin

The measurement is carried out according to JIS K7206 (A50 method: test load of 10 N, rate of heating of 50° C./h.).

(4) Density of Foam

The measurement is carried out according to JIS K7222.

(5) Expansion Ratio of Foam

Expansion ratio E is calculated according to the following formula from a density ρs of a mixture of a polylactic acid resin (a) and a thermoplastic resin (b) and from a density ρf of a foam:

$$E(\text{folds})=\rho s/\rho f,$$

wherein ρs: density ρs of mixture of polylactic acid resin (a) and thermoplastic resin (b), and ρf: density of foam.

(6) Closed Cell Content of Foam

The measurement is carried out by an air pycnometer method (using an air-comparative hydrometer 1000 type manufactured by Tokyo Science Co., Ltd.) described in ASTM-D2856, and calculated based on the average of n=5.

(7) Cell Size of Foam

A specimen is cut out of the middle portion of a foam. Straight lines of L (mm) are drawn on the cut surface along the directions of extrusion, width, and thickness of the foam. The number of air bubbles in contact with each of these straight lines is counted. Cell sizes in the extrusion direction, width direction, and thickness direction are calculated according to the following formula, and further, the average value of these three directions is used as a cell size (grid line method):

$$\text{Cell size(mm)}=1.626\times L/\text{the number of air bubbles.}$$

(8) Heat Resistance of Foam

The measurement is carried out according to a compression creep method described in JIS K6767 except that the test temperature is changed to 70° C. A test load is set to 0.05 kgf/cm². A distortion factor C (%) at 24 hours after the initiation of the test is calculated, and heat resistance is evaluated based on the value according to the following criteria:

$$C(\%)=(t_0-t_1)/t_0 \times 100,$$

wherein $t_0$: original thickness of specimen (mm), and $t_1$: thickness of specimen after 24 hours (mm),
◎: C<5 (very high heat resistance at 70° C.)
○: 5≦C≦10 (good heat resistance at 70° C.)
X: C>10 (low heat resistance at 70° C.).
(9) Property of Recovery in Compression of Form A cube with a side having a length equal to the thickness of a foam is cut out of the foam and used as a specimen. The prepared specimen is compressed to 20% of the original thickness at a speed of 130 mm/sec. with an air press (CSP-750DA manufactured by Maruni-ap) under a test environment of 23° C. A recovery rate R (%) after a lapse of 24 hours is calculated, and property of recovery in compression is evaluated based on the value according to the following criteria:

$$R(\%)=t_1/t_0 \times 100,$$

wherein $t_0$: original thickness of specimen (mm), and $t_1$: thickness of specimen after 24 hours (mm),
◎: R>75 (noticeably great property of recovery in compression)
○: 50≦R≦75 (good property of recovery in compression)
X: R<50 (low property of recovery in compression).

The physical properties of the resins and compatibilizers used are shown in Tables 1 and 2. The composition of components and the evaluation results of the physical properties of foams about the following examples and comparative examples are shown in Table 3.

Example 1

A resin mixture containing polylactic acid (PLA-1: density of 1.25 g/cm³, MFR of 3.1 g/10 min., D content of 12.2%) as polylactic acid resin (a) and a low-density polyethylene (LDPE-1: density of 0.92 g/cm³, MFR of 3.0 g/10 min., MT of 4.9 gf, Vicat softening point of 91° C.) as thermoplastic resin (b) mixed at a ratio by weight of 31/69 was supplied at a speed of 50 kg/h to the supply region of a screw extruder having a barrel inside diameter of 65 mm. At the same time, 4 parts by weight of SEBS ((c-1): density of 0.97 g/cm³, MFR of 0.3 g/10 min., styrene/ethylene/butylenes ratio=67/13/20) as a styrene-butadiene block copolymer, 0.9 parts by weight of talc as a bubble regulator, and 0.8 parts by weight of glycerin fatty acid ester (monoglyceride stearate/monoglyceride palmitate=50/50) as a gas permeation regulator, with respect to 100 parts by weight of the resin, were also supplied thereto. The barrel temperature of the extruder was adjusted to 180° C. to 190° C., and 11.8 parts by weight of normal butane as a foaming agent with respect to 100 parts by weight of this resin was pressed into a foaming agent inlet attached to the tip of the extruder and mixed with the molten resin composition to prepare a foamable molten mixture.

This foamable molten mixture was cooled to 105° C. with a cooling apparatus attached to the outlet of the extruder and then continuously extruded and foamed into an atmosphere under atmospheric pressure at ordinary temperature by use of an orifice plate having an opening with a shape of approximately 2.6 mm in average thickness and approximately 50 mm in width. Immediately thereafter, the resulting extrusion was sandwiched between rolls from above and below and molded to thereby obtain a plate-shaped resin foam having thickness of 51 mm, width of 145 mm, cell size of 1.2 mm, density of 0.021 g/cm³, expansion ratio of 49 folds, and closed cell content of 95%. The obtained foam was used and evaluated for its heat resistance and property of recovery in compression. In both tests, good results were obtained.

Example 2

A plate-shaped resin foam having thickness of 50 mm, width of 142 mm, cell size of 1.1 mm, density of 0.022 g/cm³, expansion ratio of 50 folds, and closed cell content of 93% and excellent in both heat resistance and property of recovery in compression was obtained in the same way as in Example 2 except that the ratio of polylactic acid (PLA-1) to low-density polyethylene (LDPE-1) was changed to 52/48 and the amount of the foaming agent injected was changed to 11.4 parts by weight.

Example 3

A plate-shaped resin foam having thickness of 49 mm, width of 136 mm, cell size of 1.0 mm, density of 0.025 g/cm³, expansion ratio of 46 folds, and closed cell content of 91% and excellent in both heat resistance and property of recovery in compression was obtained in the same way as in Example 2 except that the ratio of polylactic acid (PLA-1) to low-density polyethylene (LDPE-1) was changed to 73/27 and the amount of the foaming agent injected was changed to 9.9 parts by weight.

Example 4

A plate-shaped resin foam having thickness of 47 mm, width of 136 mm, cell size of 1.1 mm, density of 0.024 g/cm³, expansion ratio of 43 folds, and closed cell content of 90% and excellent in both heat resistance and property of recovery in compression was obtained in the same way as in Example 2 except that polylactic acid resin (a) was changed to polylactic acid (PLA-2: density of 1.25 g/cm³, MFR of 3.0 g/10 min., D content of 4.1%) and 1 part by weight of polycarbodiimide (carbodiimide-modified isocyanate, isocyanate group content of 2%) was used as a modifier.

Example 5

A plate-shaped resin foam having a thickness of 53 mm, width of 152 mm, cell size of 0.6 mm, density of 0.023 g/cm³, expansion ratio of 48 folds, and closed cell content of 86% and excellent in both heat resistance and property of recovery in compression was obtained in the same way as in Example 3 except that: thermoplastic resin (b) was changed to a mixture of two kinds of high-density polyethylenes (i.e., a molten mixture of HDPE-1 and HDPE-2: density of 0.96 g/cm³, MFR of 0.6 g/10 min., melt tension of 5.2 gf) (HDPE-1: density of 0.96 g/cm³, MFR of 0.3 g/10 min., MT of 7.0 gf, Vicat softening point of 128° C.; and HDPE-2: density of 0.96 g/cm³, MFR of 5.5 g/10 min., MT of 1.6 gf, Vicat softening point of 123° C.) mixed at a ratio of 3/1 (36 parts by weight of HDPE-1/12 parts by weight of HDPE-2); the amount of talc added was changed to 0.5 parts by weight; no glycerin fatty acid ester was added; the amount of the foaming agent injected was changed to 10.3 parts by weight; the opening of the orifice plate was approximately 2.8 mm in average thickness and approximately 55 mm in width; and the extruder outlet temperature for the foamable molten mixture was changed to 120° C.

Example 6

A plate-shaped resin foam having thickness of 52 mm, width of 146 mm, cell size of 0.6 mm, density of 0.027 g/cm³, expansion ratio of 43 folds, and closed cell content of 98% and excellent in both heat resistance and property of recovery in compression was obtained in the same way as in Example 3 except that: thermoplastic resin (b) was changed to polystyrene (PS-1: density of 1.05 g/cm$^3$, MFR of 0.5 g/10 min., MT of 21 gf, Vicat softening point of 102° C.); the amount of talc added was changed to 0.05 parts by weight; no glycerin fatty acid ester was added; the amount of the foaming agent injected was changed to 8.7 parts by weight; and the extruder outlet temperature for the foamable molten mixture was changed to 110° C.

Example 7

A plate-shaped resin foam having thickness of 50 mm, width of 145 mm, cell size of 0.6 mm, density of 0.033 g/cm$^3$, expansion ratio of 33 folds, and closed cell content of 82% and excellent in both heat resistance and property of recovery in compression was obtained in the same way as in Example 3 except that: thermoplastic resin (b) was changed to polypropylene (PP-1: density of 0.90 g/cm$^3$, MFR of 2.6 g/10 min., MT of 102 gf, Vicat softening point of 155° C.); the amount of talc added was changed to 0.5 parts by weight; no glycerin fatty acid ester was added; the amount of the foaming agent injected was changed to 7.7 parts by weight; the opening of the orifice plate was approximately 2.8 mm in average thickness and approximately 55 mm in width; and the extruder outlet temperature for the foamable molten mixture was changed to 140° C.

Example 8

A plate-shaped resin foam having thickness of 50 mm, width of 140 mm, cell size of 0.6 mm, density of 0.025 g/cm$^3$, expansion ratio of 44 folds, and closed cell content of 92% and excellent in both heat resistance and property of recovery in compression was obtained in the same way as in Example 3 except that: thermoplastic resin (b) was changed to a mixture of low-density polyethylene (LDPE-1) and high-density polyethylene (HDPE-2) (i.e., a molten mixture of LDPE-1 and HDPE-2: density of 0.93 g/cm$^3$, MFR of 3.7 g/10 min., melt tension of 4.0 gf) mixed at a ratio of 2/1 (32 parts by weight of LDPE-1/16 parts by weight of HDPE-2); the amount of talc added was changed to 0.7 parts by weight; the amount of glycerin fatty acid ester added was changed to 0.4 parts by weight; the amount of the foaming agent injected was changed to 9.7 parts by weight; and the extruder outlet temperature for the foamable molten mixture was changed to 111° C.

Example 9

A plate-shaped resin foam having thickness of 51 mm, width of 142 mm, cell size of 0.7 mm, density of 0.023 g/cm$^3$, expansion ratio of 48 folds, and closed cell content of 96% and excellent in both heat resistance and property of recovery in compression was obtained in the same way as in Example 3 except that: thermoplastic resin (b) was changed to a mixture of low-density polyethylene (LDPE-1) and polystyrene (PS-1) (i.e., a molten mixture of LDPE-1 and PS-1: density of 0.96 g/cm$^3$, MFR of 1.7 g/10 min., melt tension of 8.4 gf) mixed at a 2/1 ratio (32 parts by weight of LDPE-1/16 parts by weight of PS-1); the amount of talc added was changed to 0.4 parts by weight; the amount of glycerin fatty acid ester added was changed to 0.4 parts by weight; the amount of the foaming agent injected was changed to 10.1 parts by weight; and the extruder outlet temperature for the foamable molten mixture was changed to 107° C.

Example 10

A plate-shaped resin foam having thickness of 49 mm, width of 144 mm, cell size of 0.6 mm, density of 0.025 g/cm$^3$, expansion ratio of 42 folds, and closed cell content of 90% and excellent in both heat resistance and property of recovery in compression was obtained in the same way as in Example 3 except that: thermoplastic resin (b) was changed to a mixture of low-density polyethylene (LDPE-1) and polypropylene (PP-1) (i.e., a molten mixture of LDPE-1 and PP-1: density of 0.91 g/cm$^3$, MFR of 2.9 g/10 min., melt tension of 6.3 gf) mixed at a 2/1 ratio (32 parts by weight of LDPE-1/16 parts by weight of PP-1); the amount of talc added was changed to 0.7 parts by weight; the amount of glycerin fatty acid ester added was changed to 0.4 parts by weight; the amount of the foaming agent injected was changed to 9.6 parts by weight; and the extruder outlet temperature for the foamable molten mixture was changed to 128° C.

Comparative Example 1

A plate-shaped resin foam having thickness of 25 mm, width of 88 mm, cell size of 0.3 mm, density of 0.061 g/cm$^3$, expansion ratio of 20 folds, and closed cell content of 32% was obtained in the same way as in Example 1 except that: the resin component used was only polylactic acid (PLA-1); the amount of talc added was changed to 0.2 parts by weight; no glycerin fatty acid ester was added; and the amount of the foaming agent injected was changed to 9.8 parts by weight. The obtained foam was very poor in both heat resistance and property of recovery in compression.

Comparative Example 2

A plate-shaped resin foam having thickness of 30 mm, width of 87 mm, cell size of 0.7 mm, density of 0.080 g/cm$^3$, expansion ratio of 14 folds, and closed cell content of 11% was obtained in the same way as in Example 2 except that no component (c) was used. The obtained foam was very poor in both heat resistance and property of recovery in compression.

Comparative Example 3

A plate-shaped resin foam having thickness of 33 mm, width of 97 mm, cell size of 0.7 mm, density of 0.083 g/cm$^3$, expansion ratio of 13 folds, and closed cell content of 13% was obtained in the same way as in Example 5 except that no component (c) was used. The obtained foam was very poor in both heat resistance and property of recovery in compression.

Comparative Example 4

A plate-shaped resin foam having thickness of 32 mm, width of 94 mm, cell size of 0.6 mm, density of 0.094 g/cm$^3$, expansion ratio of 12 folds, and closed cell content of 16% was obtained in the same way as in Example 6 except that no component (c) was used. The obtained foam was very poor in both heat resistance and property of recovery in compression.

Comparative Example 5

A plate-shaped resin foam having thickness of 28 mm, width of 87 mm, cell size of 0.7 mm, density of 0.130 g/cm$^3$, expansion ratio of 8 folds, and closed cell content of 10% was obtained in the same way as in Example 7 except that no component (c) was used. The obtained foam was very poor in both heat resistance and property of recovery in compression.

Comparative Example 6

A plate-shaped resin foam having thickness of 31 mm, width of 89 mm, cell size of 0.7 mm, density of 0.078 g/cm$^3$, expansion ratio of 14 folds, and closed cell content of 12% was obtained in the same way as in Example 2 except that component (c) was changed to ethylene-glycidyl methacrylate copolymer ((c-2): density of 0.94 g/cm$^3$, MFR of 3 g/10 min.). The obtained foam was very poor in both heat resistance and property of recovery in compression.

TABLE 1

|  |  |  | Denisty g/cm$^3$ | Melt mass-flaw rate (MFR) g/10 min. | Melt tension (MT) gf | Vicat softening point °C. | D content % |
|---|---|---|---|---|---|---|---|
| Polylactic acid resin (a) |  | PLA-1 | 1.25 | 3.1 | — | — | 12.2 |
|  |  | PLA-2 | 1.25 | 3.0 | — | — | 4.1 |
| Thermoplastic resin (b) | Low-densithy polyethylene | LDPE-1 | 0.92 | 3.0 | 4.9 | 91 |  |
|  | High-desity polyethylene | HDPE-1 | 0.96 | 0.3 | 7.0 | 128 |  |
|  |  | HDPE-2 | 0.96 | 5.5 | 1.6 | 123 |  |
|  | Polystyrene | PS-1 | 1.05 | 0.5 | 21 | 102 |  |
|  | Polypropylene | PP-1 | 0.90 | 2.6 | 7.6 | 155 |  |

TABLE 2

|  |  |  | Density g/cm$^3$ | Melt mass-flow rate (MFR) g/10 min. |
|---|---|---|---|---|
| (c) | Styrene-butadiene block copolymer | (c-1) | 0.97 | 0.3 |
|  | Ethylene-glycidyl methacrylate copolymer | (c-2) | 0.94 | 3 |

TABLE 3-1

|  |  |  | Example 1 | Example 2 | Example 3 | Example 4 | Example 5 | Example 6 | Example 7 | Example 8 |
|---|---|---|---|---|---|---|---|---|---|---|
| Resin composition (ratio by Weight) | Polylactic acid resin (a) | PLA-1 | 31 | 52 | 73 |  | 52 | 52 | 52 | 52 |
|  |  | PLA-2 |  |  |  | 31 |  |  |  |  |
|  | Thermoplastic resin (b) | LDPE-1 | 69 | 48 | 27 | 69 |  |  |  | 32 |
|  |  | HDPE-1 |  |  |  |  | 36 |  |  |  |
|  |  | HDPE-2 |  |  |  |  | 12 |  |  | 16 |
|  |  | PS-1 |  |  |  |  |  | 48 |  |  |
|  |  | PP-1 |  |  |  |  |  |  | 48 |  |
| MT(gf) of thermoplastic resin (b) |  |  | 4.9 | 4.9 | 4.9 | 4.9 | 5.2 | 21 | 7.6 | 4.0 |
| Vicat softening point (° C.) of thermoplastic resin (b) |  |  | 91 | 91 | 91 | 91 | 127 | 102 | 155 | 101 |
| Ratio of melt mass-flow rates: MFR-a/MFR-b |  |  | 1.0 | 1.0 | 1.0 | 1.0 | 0.2 | 0.2 | 0.9 | 1.2 |
| (c) (parts by weight) | (c-1) |  | 4 | 4 | 4 | 4 | 4 | 4 | 4 | 4 |
|  | (c-2) |  |  |  |  |  |  |  |  |  |
| Modifier (parts by weight)*[1] |  |  |  |  |  | 1 |  |  |  |  |
| Bubble regulator (parts by weight)*[2] |  |  | 0.9 | 0.9 | 0.9 | 0.9 | 0.5 | 0.05 | 0.5 | 0.7 |
| Gas permeation regulator (parts by weight)*[3] |  |  | 0.8 | 0.8 | 0.8 | 0.8 | — | — | — | 0.4 |
| Foaming agent (parts by weight)*[4] |  |  | 11.8 | 11.4 | 9.9 | 10.2 | 10.3 | 8.7 | 7.7 | 9.7 |
| Opening of orifice plate | Average thickness (mm) |  | 2.6 | 2.6 | 2.6 | 2.6 | 2.8 | 2.6 | 2.8 | 2.6 |

TABLE 3-1-continued

|  |  | Example 1 | Example 2 | Example 3 | Example 4 | Example 5 | Example 6 | Example 7 | Example 8 |
|---|---|---|---|---|---|---|---|---|---|
| Sectional size of foam | width (mm) | 50 | 50 | 50 | 50 | 55 | 50 | 55 | 50 |
|  | Thickness (mm) | 51 | 50 | 49 | 47 | 53 | 52 | 50 | 50 |
|  | Width (mm) | 145 | 142 | 136 | 136 | 152 | 146 | 145 | 140 |
| Density (g/cm$^3$) |  | 0.021 | 0.022 | 0.025 | 0.024 | 0.023 | 0.027 | 0.033 | 0.025 |
| Expansion ratio (fold) |  | 49 | 50 | 46 | 43 | 48 | 43 | 33 | 44 |
| Closed-cell content (%) |  | 95 | 93 | 91 | 90 | 86 | 98 | 82 | 92 |
| Cell size (mm) |  | 1.2 | 1.1 | 1.0 | 1.1 | 0.6 | 0.6 | 0.6 | 0.6 |
| Distortion factor C (%)/heat resistance |  | 6 ○ | 7 ○ | 8 ○ | 6 ○ | 3 ◎ | 3 ◎ | 2 ◎ | 4 ◎ |
| Recovery rate R (%)/Property of recovery in compression |  | 98 ◎ | 96 ◎ | 85 ◎ | 96 ◎ | 69 ○ | 61 ○ | 71 ○ | 94 ◎ |

*[1] polycarbodiimide
*[2] talc
*[3] glycerin fatty acid ester
*[4] normal butane

TABLE 3-2

|  |  |  | Example 9 | Example 10 | Comparative Example 1 | Comparative Example 2 | Comparative Example 3 | Comparative Example 4 | Comparative Example 5 | Comparative Example 6 |
|---|---|---|---|---|---|---|---|---|---|---|
| Resin composition (ratio by Weight) | Polylactic acid resin (a) | PLA-1 | 52 | 52 | 100 | 52 | 52 | 52 | 52 | 52 |
|  |  | PLA-2 |  |  |  |  |  |  |  |  |
|  | Thermoplastic resin (b) | LDPE-1 | 32 | 32 |  | 48 |  |  |  | 48 |
|  |  | HDPE-1 |  |  |  |  | 36 |  |  |  |
|  |  | HDPE-2 |  |  |  |  | 12 |  |  |  |
|  |  | PS-1 | 16 |  |  |  |  | 48 |  |  |
|  |  | PP-1 |  | 16 |  |  |  |  | 48 |  |
| MT(gf) of thermoplastic resin (b) |  |  | 8.4 | 6.3 | — | 4.9 | 5.2 | 21 | 7.6 | 4.9 |
| Vicat softening point (° C.) of thermoplastic resin (b) |  |  | 97 | 126 | — | 91 | 127 | 102 | 155 | 91 |
| Ratio of melt mass-flow rates: MFR-a/MFR-b |  |  | 0.5 | 0.9 | — | 1.0 | 0.2 | 0.2 | 0.9 | 1.0 |
| (c) (parts by weight) | (c-1) |  | 4 | 4 |  |  |  |  |  |  |
|  | (c-2) |  |  |  |  |  |  |  |  | 4 |
| Modifier (parts by weight)*[1] |  |  |  |  |  |  |  |  |  |  |
| Bubble regulator (parts by weight)*[2] |  |  | 0.4 | 0.7 | 0.2 | 0.9 | 0.5 | 0.05 | 0.5 | 0.9 |
| Gas permeation regulator (parts by weight)*[3] |  |  | 0.4 | 0.4 | — | 0.8 | — | — | — | 0.8 |
| Foaming agent (parts by weight)*[4] |  |  | 10.1 | 9.6 | 9.8 | 11.4 | 10.3 | 8.7 | 7.7 | 11.4 |
| Opening of orifice plate | Average thickness (mm) |  | 2.6 | 2.6 | 2.6 | 2.6 | 2.8 | 2.6 | 2.8 | 2.6 |
|  | width (mm) |  | 50 | 50 | 50 | 50 | 55 | 50 | 55 | 50 |
| Sectional size of foam | Thickness (mm) |  | 51 | 49 | 25 | 30 | 33 | 32 | 28 | 31 |
|  | Width (mm) |  | 142 | 144 | 88 | 87 | 97 | 94 | 87 | 89 |
| Density (g/cm$^3$) |  |  | 0.023 | 0.025 | 0.061 | 0.080 | 0.083 | 0.094 | 0.130 | 0.078 |
| Expansion ratio (fold) |  |  | 48 | 42 | 20 | 14 | 13 | 12 | 8 | 14 |
| Closed-cell content (%) |  |  | 96 | 90 | 32 | 11 | 13 | 16 | 10 | 12 |
| Cell size (mm) |  |  | 0.7 | 0.6 | 0.3 | 0.7 | 0.7 | 0.6 | 0.7 | 0.7 |
| Distortion factor C (%)/heat resistance |  |  | 4 ◎ | 3 ◎ | 49 X | 37 X | 19 X | 16 X | 12 X | 36 X |
| Recovery rate R (%)/Property of recovery in compression |  |  | 93 ◎ | 95 ◎ | 32 X | 26 X | 25 X | 24 X | 23 X | 27 X |

*[1] polycarbodiimide
*[2] talc
*[3] glycerin fatty acid ester
*[4] normal butane

INDUSTRIAL APPLICABILITY

A foam of the present invention has high closed cell content, expansion ratio and heat resistance performance and the foam therefore can be utilized in a high-performance cushioning material or heat insulating material.

The invention claimed is:

1. A foam comprising (a) a polylactic acid resin, (b) at least one thermoplastic resin selected from a polyolefin resin and a polystyrene resin, and (c) a block copolymer of a vinyl aromatic compound and a conjugated diene, wherein a ratio of (a) to (b) by weight (a/b) is 80/20 to 20/80, and the foam comprises 0.5 to 20 parts by weight of (c) with respect to 100 parts by weight of (a) and (b) in total.

2. The foam according to claim 1, wherein the block copolymer (c) of the vinyl aromatic compound and the conjugated diene is a styrene-butadiene block copolymer resin.

3. The foam according to claim 1, wherein the thermoplastic resin (b) has a melt tension of 2 to 200 gf at 190° C.

4. The foam according to claim 1, wherein the thermoplastic resin (b) has a Vicat softening point of 80° C. or higher.

5. The foam according to claim 1, wherein a ratio of a melt mass-flow rate of the thermoplastic resin (b) (MFR-b) at 190° C. to a melt mass-flow rate of the polylactic acid resin (a) (MFR-a) at 190° C. (MFR-b/MFR-a) is 0.01 to 10.

6. The foam according to claim 1, wherein the polylactic acid resin (a) is a copolymer of 10 to 90% by mole of L-lactic acid and 90 to 10% by mole of D-lactic acid.

7. The foam according to claim 1, wherein the polylactic acid resin (a) is modified with at least one modifier selected from a carbodiimide compound, an epoxy compound, an isocyanate compound, and an organic peroxide, and an amount of the modifier added is 0.05 to 10 parts by weight with respect to 100 parts by weight of the polylactic acid resin.

8. The foam according to claim 1, wherein the thermoplastic resin (b) comprises (b-1) a low-density polyethylene resin and (b-2) at least one member selected from high-density polyethylene, a polypropylene resin, and a polystyrene resin, and a ratio of (b-1) to (b-2) by weight is 90/10 to 10/90.

9. The foam according to claim 1, wherein the foam has a density of 0.005 to 0.5 g/cm$^3$.

10. A cushioning material using the foam according to claim 1.

11. A heat insulating material using the foam according to claim 1.

12. The foam according to claim 2, wherein the thermoplastic resin (b) has a melt tension of 2 to 200 gf at 190° C.

13. The foam according to claim 12, wherein the thermoplastic resin (b) has a Vicat softening point of 80° C. or higher.

14. The foam according to claim 13, wherein a ratio of a melt mass-flow rate of the thermoplastic resin (b) (MFR-b) at 190° C. to a melt mass-flow rate of the polylactic acid resin (a) (MFR-a) at 190° C. (MFR-b/MFR-a) is 0.01 to 10.

15. The foam according to claim 14, wherein the polylactic acid resin (a) is a copolymer of 10 to 90% by mole of L-lactic acid and 90 to 10% by mole of D-lactic acid.

16. The foam according to claim 15, wherein the polylactic acid resin (a) is modified with at least one modifier selected from a carbodiimide compound, an epoxy compound, an isocyanate compound, and an organic peroxide, and an amount of the modifier added is 0.05 to 10 parts by weight with respect to 100 parts by weight of the polylactic acid resin.

17. The foam according to claim 16, wherein the thermoplastic resin (b) comprises (b-1) a low-density polyethylene resin and (b-2) at least one member selected from high-density polyethylene, a polypropylene resin, and a polystyrene resin, and a ratio of (b-1) to (b-2) by weight is 90/10 to 10/90.

18. The foam according to claim 17, wherein the foam has a density of 0.005 to 0.5 g/cm$^3$.

19. A cushioning material using the foam according to claim 18.

20. A heat insulating material using the foam according to claim 18.

* * * * *